(12) United States Patent
Vajapeyam

(10) Patent No.: US 8,694,962 B2
(45) Date of Patent: Apr. 8, 2014

(54) ASPECT-ORIENTED PARALLEL PROGRAMMING LANGUAGE EXTENSIONS

(75) Inventor: Sriram Vajapeyam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 900 days.

(21) Appl. No.: 12/433,292

(22) Filed: Apr. 30, 2009

(65) Prior Publication Data

US 2010/0281464 A1    Nov. 4, 2010

(51) Int. Cl.
*G06F 9/44*   (2006.01)

(52) U.S. Cl.
USPC .......................................... 717/119; 717/120

(58) Field of Classification Search
USPC ........................................................ 717/119
See application file for complete search history.

(56) References Cited

U.S. PATENT DOCUMENTS

| | | | | |
|---|---|---|---|---|
| 7,865,911 | B2* | 1/2011 | Lin et al. | 719/328 |
| 8,209,664 | B2* | 6/2012 | Yu et al. | 717/119 |
| 2004/0123187 | A1* | 6/2004 | Colyer | 714/38 |
| 2006/0271345 | A1* | 11/2006 | Kasuya | 703/14 |
| 2008/0276220 | A1* | 11/2008 | Munshi et al. | 717/119 |
| 2010/0281464 | A1* | 11/2010 | Vajapeyam | 717/119 |

OTHER PUBLICATIONS

Carlos Augusto Da Silva Cunha, Reusable Aspect-Oriented implementations of Concurrency Patterns and Mechanisms, Universidade do Minho (Sep. 2006), retrieved from http://citeseerx.ist.psu.edu/viewdoc/summary?doi=10.1.1.109.4962 on Jul. 13, 2012.*
Kudlur et al., Orchestrating the Execution of Stream Programs on Multicore Platforms, University of Michigan (Jun. 2008), retrieved from http://cccp.eecs.umich.edu/papers/kvman-pldi08.pdf on Jul. 13, 2012.*
"Tilera Architecture Brief," Tilera Corporation, available at http://www.tilera.com/pdf/ProductBrief_TileArchitecture_Web_v4.pdf.
Sobral et al., Aspect-Oriented Support for Modular Parallel Computing. 5th AOSD Workshop on Aspects, Components, and Patterns for Infrastructure Software. Technical Report CS-2006-01, p. 37-41, Jan. 2006.

(Continued)

*Primary Examiner* — Don Wong
*Assistant Examiner* — Theodore Hebert
(74) *Attorney, Agent, or Firm* — Ryan, Mason & Lewis, LLP

(57) ABSTRACT

Techniques for using one or more aspect-oriented parallelism primitives to implement one or more aspects of a program in parallel are provided. The techniques include using one or more aspect-oriented parallelism primitives to implement one or more aspects of a program in parallel, wherein implementing the one or more aspects of a program in parallel comprises implementing the one or more aspects of a program in parallel on a multi-core processor.

15 Claims, 7 Drawing Sheets

(56) References Cited

OTHER PUBLICATIONS

Laddad, R. "I Want My AOP! Part 2: Learn AspectJ to Better Understand Aspect-Oriented Programming," JavaWorld.com, Mar. 1, 2002. http://www.javaworld.com/javaworld/jw-03-2002/jw-0301-aspect2.html?page=1.

Golla, R. "Niagara2: A Highly Threaded Server-on-a-Chip," SUN Microsystems. http://www.opensparc.net/pubs/preszo/06/04-Sun-Golla.pdf Oct. 10, 2006.

Aspect-Oriented Software Development Community. Available at www.AOSD.net downloaded Apr. 30, 2009.

Kiczales et al. "Aspect-Oriented Programming," European Conference on Object-Oriented Programming (ECOOP), 1997. http://www.parc.com/research/projects/aspectj/downloads/ECOOP1997-AOP.pdf.

Laddad, R. "I Want My AOP! Part1: Separate Software Concerns with Aspect-Oriented Programming," JavaWorld.com, Jan. 18, 2002. http://www.javaworld.com/javaworld/jw-01-2002/jw-0118-aspect.html.

Colyer, A. AOP@Work: Introducing AspectJ 5. A first look at Java 5 support in AspectJ, and other new features. IBM DeveloperWorks, Jul. 12, 2005. http://www.ibm.com/developerworks/java/library/j-aopwork8/index.html?S_TACT=105AGX02&S_CMP=EDU.

Sobral et al., Aspect-Oriented Support for Modular Parallel Computing. 5th AOSD Workshop on Aspects. Technical Report CS-2006-01, p. 37-41, Jan. 2006.

Tilera Architecture Brief, Tilera Corporation, available at http://wwvv.tilera.com/pdf/ProductBrief_TileArchitecture_Web_v4.pdf, 2008.

\* cited by examiner

```
/* The Main thread, T1 */ create_tree()
{

/* export viewpoints and breakpoints to other threads */
  /* W is the dynamic stream of all viewpoints */

EXPORT viewpoints W, w_newelement, w_insert, w_left, w_right;
  EXPORT BREAKPOINTS b_traverse;

EXTERN TREE RANDTREE;  /* the tree being inserted into */
  TREE *preptr=NULL, *ptr=NULL, *newnode;
  BOOLEAN INSERTED = FALSE;
  int i, cointoss;

/* initialize ptrs for tree traversal */
  preptr=RANDTREE;
  ptr=RANDTREE->next;

/* insert all elements into the tree, at random leaf nodes */
  for (i=0; i < 100; i++) {  /* for all elements */
    viewpoint(w_newelement, i);  /* set viewpoint here */
    newnode = new(node);

while(!INSERTED) {

/* search for a leaf node */
      if (ptr == NULL) {/* leaf node; insert here */ viewpoint(w_insert, preptr);  /* set viewpoint here */ if (preptr-> left == NULL)
          preptr->left = newnode;
        else
          preptr->right = newnode;

ptr = newnode;
        INSERTED = TRUE;

} /* if at leaf node, insert */ else {  /* not yet at leaf node */

/* randomly go left or right down the tree */
        cointoss = (int) rand(seed);
```

FIG. 2B
(CONTINUED FROM FIG. 2A)

```
        if ((cointoss % 2) == 0) {/* randomly go left */
          viewpoint(w_left, ptr); /* set breakpoint here */
          preptr = ptr;
          ptr = ptr->left;
        }
        else { /* randomly go right */
          viewpoint(w_right, ptr); /* set breakpoint here */
          preptr = ptr;
          ptr = ptr->right;
        }
      } /* else go down another level of the tree looking for a leaf node */
    } /* do while not inserted */ cond_breakpoint(b_traverse); /* set conditional breakpoint; */
              /* stops here only when some other thread has issued a */
                  /* catch_breakpoint() for this named breakpoint */
  } /* do for all elements to be inserted */
}
```

```
/* The Tree Balancer thread, T2 */
EXTERN WATCHPOINTS W, w_newelement, w_insert, w_left, w_right;
EXTERN BREAKPOINTS b_traverse;

tree_balancer()
{
   WATCHPOINTS w_current;
   BOOLEAN ENDOFWATCHEDTHREAD = FALSE;
   int left_trav, right_trav;

while (!ENDOFWATCHEDTHREAD) {
      ENDOFWATCHEDTHREAD = readstream(W, &w_current);
      /* returns the latest watchpoint */

/* wait till creation of new element for insertion */
      while ((!ENDOFWATCHEDTHREAD) && (w_current->value != W_NEWELEMENT))
         ENDOFWATCHEDTHREAD = readstream(W, &w_current);
      }

/* now monitor how tree is traversed for insertion */
      left_trav = right_trav = 0;

/* watch all traversals until insert point is reached */
      while ((!ENDOFWATCHEDTHREAD) && (w_current->value != W_INSERT)) {
         if (w_current->value == W_LEFT)
            left_trav ++;
         else if (w_current->value == W_RIGHT)
            right_trav++;
         ENDOFWATCHEDTHREAD = readstream(W, &w_current);
      } /* monitor tree traversal */

/* insertion point reached; now check for tree balance */
      if (magnitude(left_trav - right_trav) > THRESHOLD) {
         /* insertion was rather unbalanced; move the inserted node to a
            different place */

/* stop insert thread asynchronously but at a coherent point */
         catch_breakpoint(b_traverse);
            /* stop the insert thread at a suitable, coherent point */
            /* insert thread stops at breakpoints only when catch_breakpoint
               is called */

/* now relocate the recently inserted node in the tree */
         relocatenode(RANDTREE, w_current->ptr); /* "ptr" points to leaf node
            prior to current insertion */

/* allow the insert thread to continue now */
         release_breakpoint(b_traverse);
      } /* if insert was unbalanced */
   } /* while insert thread is active */
}
```

USE ONE OR MORE ASPECT-ORIENTED PARALLELISM PRIMITIVES TO IMPLEMENT ONE OR MORE ASPECTS OF A PROGRAM IN PARALLEL, WHEREIN IMPLEMENTING THE ONE OR MORE ASPECTS OF A PROGRAM IN PARALLEL COMPRISES IMPLEMENTING THE ONE OR MORE ASPECTS OF A PROGRAM IN PARALLEL ON A MULTI-CORE PROCESSOR —602

ASPECT-ORIENTED PARALLEL PROGRAMMING LANGUAGE EXTENSIONS

FIELD OF THE INVENTION

Embodiments of the invention generally relate to information technology, and, more particularly, to program parallelization.

BACKGROUND OF THE INVENTION

Parallelization of programs for the current multi-core processors poses a challenge. In existing approaches, multi-core processors incorporate a few to few dozen processing cores, and each core simultaneously executes multiple software threads. As such, the number of threads executing simultaneously on a processor chip is already significant, and this number promises to increase exponentially as the number of transistors on chip scale up (for example, according to Moore's Law).

Additionally, existing approaches include aspect-oriented programming (AOP). In existing AOP approaches, a program is modularized into several "aspects," but these aspects are not designed for parallel implementation. Aspects in traditional AOP execute code (for example, called "advices") before, after, or around (that is, to control) a breakpoint, but not in parallel with the main thread.

SUMMARY OF THE INVENTION

Principles and embodiments of the invention provide computer system features and support for aspect-oriented parallel programming, embodied, for example, as programming language extensions, thread-library extensions, etc.

An exemplary method (which may be computer-implemented) for using one or more aspect-oriented parallelism primitives to implement one or more aspects of a program in parallel, according to one aspect of the invention, can include using one or more aspect-oriented parallelism primitives to implement one or more aspects of a program in parallel, wherein implementing the one or more aspects of a program in parallel comprises implementing the one or more aspects of a program in parallel on a multi-core processor.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 2A and 2B is a (continuous) diagram illustrating pseudo-code for an exemplary main thread, according to an embodiment of the present invention;

FIG. 3 is a diagram illustrating pseudo-code for an exemplary tree-balancer thread, according to an embodiment of the present invention;

DETAILED DESCRIPTION OF EMBODIMENTS

Figure 1:
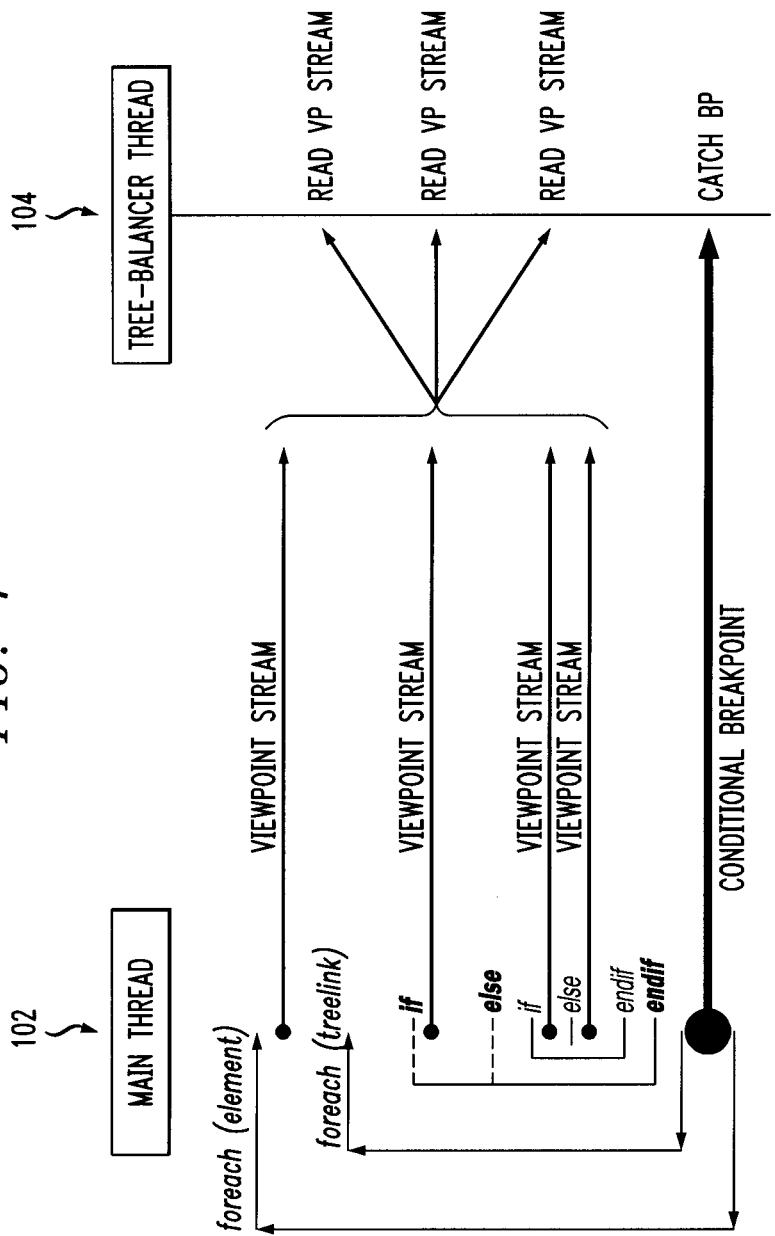
FIG. 1 is a diagram illustrating conceptual use of aspect-oriented parallel language extensions, according to an embodiment of the present invention.

Principles of the invention include aspect-oriented parallel programming language extensions, and supporting multi-core processor extensions. One or more embodiments of the invention include parallel programming language features that allow different "aspects" or "concerns" of a program, compiled as separate threads, to interact with each other efficiently and effectively. The parallel programming language extensions detailed herein are appropriate for aspect-based parallelization and are efficiently supportable by enhanced multi-core processor hardware. As such, a programmer can better express programs in an enhanced aspect-oriented programming (AOP) paradigm and the compiler can generate better code for such programs.

As detailed herein, aspect-oriented parallel-programming primitives are proposed, embodied, for example, as part of either parallel programming languages and/or thread libraries to enable efficient parallel implementation of different aspects or concerns of a program. The primitives can be supported, by way of example, with suitable hardware extensions to multi-core processors, so as to enable efficient implementation.

The techniques described herein include multi-core parallelism, wherein the parallel threads can be, for example, physically close to each other, and they can communicate with each other faster than they can access main memory (for example, off-chip dynamic random access memory (DRAM)). Further, the threads that implement on the same core can share physical hardware resources such as, for example, functional units, registers, and the primary cache. Parallel processors in prior approaches, on the other hand, were based on single-core processors and required off-chip messages for inter-thread communication. Such physical proximity of threads as in multi-core processors can enable efficient frequent communication between relatively fine-grain threads of a program.

The techniques detailed herein include aspect-oriented extensions to parallel programming languages and thread libraries to support the effective parallelization of the different aspects of a program. Also, these language extensions can be supported by suitable architectural and micro-architectural enhancements to multi-core processors. Language extensions of one or more embodiments of the invention can include, by way of example, the following.

Language extensions can include the ability of a thread to set a breakpoint (at compile time) on another thread of the same program. A thread stops implementation when one of its breakpoints is reached in its control flow. Additionally, language extensions can include the ability of a thread to set a watch-point (at compile time) on a register or memory location of another thread of the same program. A thread stops implementation when one of its registers or memory locations, specified by a watch-point, changes value. Another language extension can include the ability of a thread to ask (at compile time) a sibling thread to send it a stream containing all of the values taken on by a register or memory location specified in a viewpoint. The thread asks to view all values of the specified viewpoint without stopping the sibling thread.

Further, language extensions can include a thread issuing a continuation to a stopped sibling thread, thus resuming the implementation of that stopped thread. The sibling thread might have been stopped by an earlier breakpoint or watch-point set by the current thread. Also, conditional breakpoints, conditional watch-points and conditional viewpoints are breakpoints, watch-points and viewpoints that are activated only when the break/watch/view-point-setting thread issues a "Catch Breakpoint," "Catch Watch-point," or "Catch Viewpoint" instruction. At other times, these breakpoints, watch-points and viewpoints are dormant. Thus, a catch break/watch/viewpoint necessarily has to be used in conjunction with the conditional constructs described above. These conditional constructs are in lieu of the ability to set these points at run-time.

Further, asynchronous viewpoints are viewpoints that are non-blocking and assume fixed-size underlying streams. To wit, if the viewpoint reader thread does not adequately keep pace with the viewpoint writer thread, then elements at the viewpoint stream's head are dropped to accommodate new writes by the viewpoint reader. Asynchronous viewpoints are intended to be used for sampling of registers or memory locations by a reader thread.

As detailed herein, one or more embodiments of the invention include control-points related to a program's control flow such as, for example, breakpoint and conditional breakpoint. The programming-language primitive "breakpoint" can include an allied language primitive of "continue," wherein a programmer can set breakpoints on specific statements in a program thread and insert corresponding "Continue" statements in a sibling thread. Also, a program can deadlock if breakpoints and continues are not correctly paired. The programming-language primitive "conditional breakpoint" can include allied language primitives of "catch breakpoint" and "continue," wherein a conditional breakpoint operates when a sibling thread issues a "Catch Breakpoint" during program implementation. The rest of the operation can be similar to a regular breakpoint.

One or more embodiments of the invention also include control-points related to a program's data values such as, for example, watchpoint, conditional watchpoint, viewpoint, asynchronous viewpoint, conditional asynchronous viewpoint, deactivate, catch and continue. The programming-language primitive "watchpoint" (<MemAddr/RegId>[Value]) can include an allied language primitive of "continue," wherein a programmer can set a watchpoint instruction in the program thread to be watched, and a corresponding continue in a sibling thread. The watched thread stops when the specified memory location or register location reaches the specified value, or if no value is specified, whenever there is a change in value.

The programming-language primitive "conditional watchpoint" can include allied language primitives of "catch watchpoint" and "continue" similar to conditional breakpoint operation. The programming-language primitive "viewpoint" (MemAddr/RegId) can include an allied language primitive of "[Read Viewpoint D]," wherein a programmer can insert a viewpoint instruction in the thread of interest and read the viewpoint in sibling threads. Every new value of the specified memory location and/or register location is sent to sibling threads over a logical queue. Reads by sibling threads de-queue values, and when a viewpoint encounters a full physical queue its thread blocks until the queue is able to accept the new viewpoint value. Also, no "Continue" is necessary for viewpoints.

The programming-language primitive of "asynchronous viewpoint" (MemAddr/RegId), which includes an allied language primitive of "[Read Viewpoint D]," wherein, as opposed to a viewpoint, an asynchronous viewpoint does not block on encountering a full physical queue. Rather, it pushes out the head of the queue to make room at the queue-tail for the new value, and proceeds with implementation. Also, the programming-language primitive of "conditional asynchronous viewpoint" (<MemAddr/RegId>) can include an allied language primitive of "catch viewpoint," wherein the primitive is similar to a viewpoint but activated only when a sibling thread issues a Catch Viewpoint during program implementation.

Additionally, with the programming-language primitive of "deactivate" (<BreakpointID/WatchpointID/ViewpointID>) a programmer can insert a "Deactivate" into any thread to turn off a previously inserted control point. Every control point has a unique identifier and/or label, similar to a variable name, with similar visibility (that is, scope) rules as variables. The programming-language primitive "catch" (<ControlPointID>) activates a conditional control-point. The identifier (ID) of the target control-point is a needed parameter with such an instruction. Further, the programming-language primitive "continue" (<ThreadID/ControlPointID>) allows a thread that is stopped at a control-point to continue implementation. For example, a programmer can specify just the ID of the target thread if so desired, or else the specific target control-point ID.

Also, one or more embodiments of the invention can include default programming language as well as these new inter-thread communication primitives that leverage the benefits of multi-core processors for their implementation.

A usage model of one or more embodiments of the invention can include the following. Consider an example program that uses a quasi-balanced binary tree as an index into some data. There are two "aspects" to this exemplary program: (i) an aspect that reads, inserts, and deletes data using the tree, simultaneously modifies the tree, just for correct functionality, upon data inserts and deletions; and (ii) an aspect that keeps the tree quasi-balanced upon insertions and deletions. FIG. 1 conceptually illustrates how these two aspects could be implemented as separate threads that communicate using language features such as described herein.

FIG. 1 is a diagram illustrating conceptual use of aspect-oriented parallel language extensions, according to an embodiment of the present invention. By way of illustration, FIG. 1 depicts a main thread 102 and a tree-balancer thread 104. The tree-balancer thread 104 sets viewpoints on the main thread 102 to continuously monitor how the tree is being traversed, across several data accesses, by the main program.

The viewpoints monitor specific code points, and thus control flow, in the main thread 102. The tree-balancer thread can also set suitable conditional breakpoints and watch-points on the main thread at appropriate places, such as in the insert and delete methods.

When the tree-balancer thread 104 infers that the tree is significantly imbalanced, via its viewpoint monitors, it issues appropriate catch instructions to stop the main thread at appropriate conditional break/watch-points, so that it can safely balance the appropriate portion of the tree. Any attempt by the main thread 102 to access the tree portion under reconstruction will be prevented by the catching of the conditional watch-points and breakpoints.

FIGS. 2A and 2B combine to form a diagram illustrating pseudo-code 202 for an exemplary main thread, according to an embodiment of the present invention. Also, FIG. 3 is a diagram illustrating pseudo-code 302 for an exemplary tree-balancer thread, according to an embodiment of the present invention.

Note, for example, that while similar functionality could be implemented via traditional shared-memory or message-passing modes of communication, such techniques would be rather cumbersome for such frequent communication. Furthermore, they would also be prohibitively inefficient. The language primitives of one or more embodiments of the invention are both more appropriate for the proposed usage and more efficiently implementable via enhancements to multi-core processors.

Multi-core enhancements to support proposed language features can include, by way of example, the following. One or more embodiments of the invention assume, without loss of generality, that the communicating threads run on either the same processor core or on neighboring cores of the processor chip and that a set of hardware queues are implemented between every thread-pair of a core and between every thread-pair of neighboring cores. These hardware queues are used to support the logical streams that carry the data corresponding to viewpoints. Each hardware queue is accessible to the machine instruction set via either a register identifier or a special memory address (that is, memory map). The compiler can allocate hardware queues to viewpoints in a manner similar to how it allots hardware registers to program variables.

The hardware queues are specialized to be non-blocking or asynchronous when thus configured, that is, when the queue becomes full, the write of a new element to the queue tail pushes out the queue head to make space. This supports the program language feature of asynchronous viewpoints, which are non-blocking or asynchronous. Such hardware queues enable efficient implementation of viewpoints. Implementing viewpoints via shared memory is an inefficient alternative.

One or more embodiments of the invention can also assume that there is hardware support in the core for implementing breakpoints and watch-points. For example, upon every write to the program counter (PC), the PC indexes into a hardware table of breakpoints, and upon a match, a breakpoint is flagged. The matching of the PC with the table is similar to that of a traditional cache lookup. Watch-points can also be similarly supported by a table: upon every write (STORE) to a memory location, the location's memory address indexes into a table of watch-point memory addresses, and upon a match, a watch-point is flagged. These are merely illustrative examples and do not preclude other hardware support for the efficient implementation of breakpoints, watch-points and viewpoints.

One or more embodiments of the invention include AOP or AOP-like extensions applicable to any traditional shared-memory parallel programming language. Such extensions, as noted herein, can allow individual aspects of a program to be implemented in parallel on a multi-core processor, leveraging the physical proximity of threads in a multi-core processor to achieve acceptable performance efficiencies. In one or more embodiments of the invention, the language extensions can be practiced without constraints because they require an appropriate compiler or interpreter to translate the language extensions into executable code, which can be achieved with known programming practices. Further, one or more embodiments of the invention include addressing intermediate language primitives.

Figure 4:
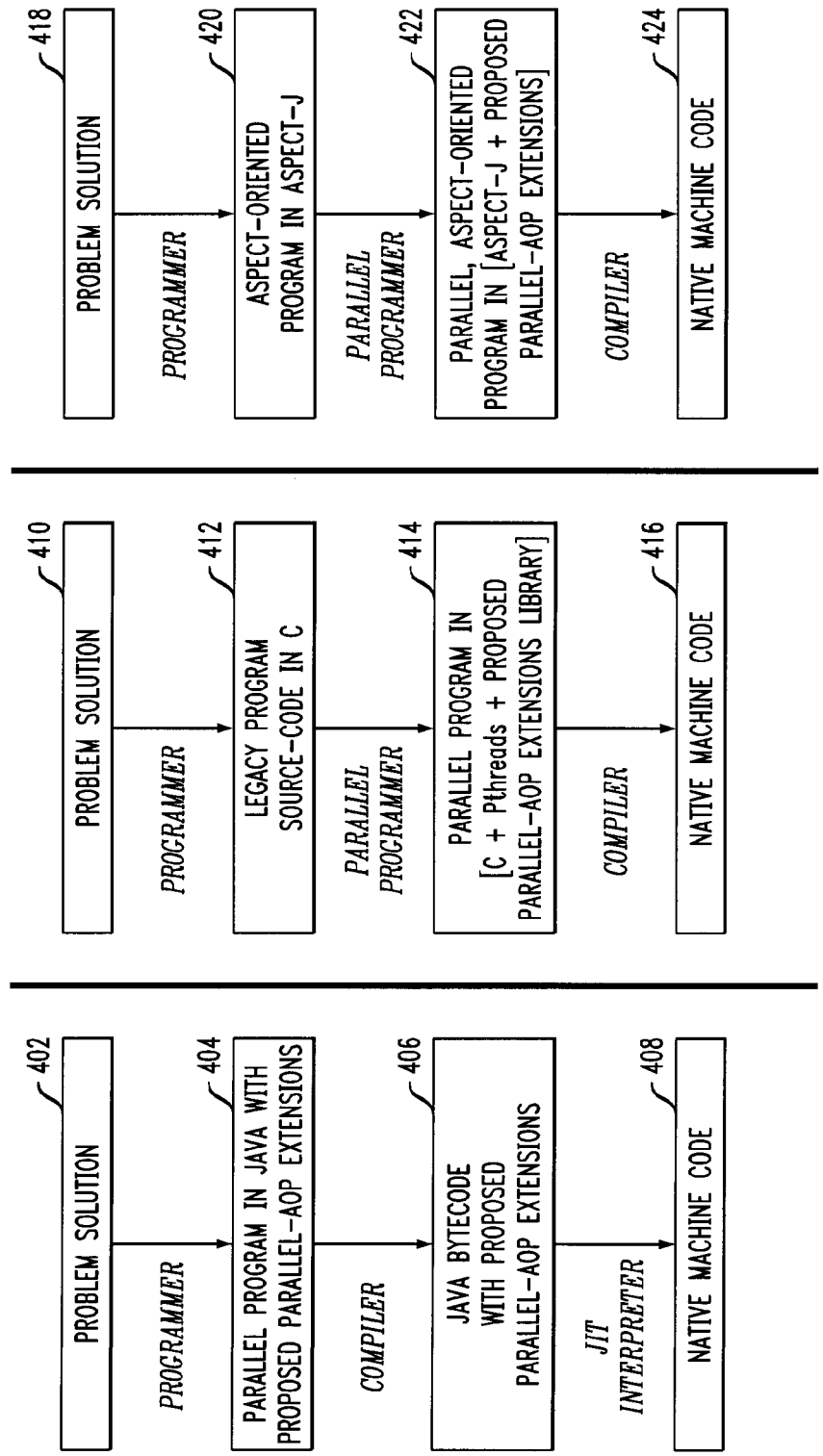
FIG. 4 is a block diagram illustrating multiple exemplary embodiments, according to an aspect of the invention.

FIG. 4 is a block diagram illustrating multiple exemplary embodiments, according to an aspect of the invention. By way of example, as depicted in FIG. 4, problem solution 402 can be programmed by a programmer in a version 404 of the programming-language Java that includes the proposed parallel-AOP (p-AOP) extensions described herein. This program can then be compiled (via a compiler) into Java bytecode 406 that also has p-AOP extensions as detailed herein. Finally, when this bytecode version is implemented on a computer, the Java run-time interpreter on the computer interprets the program into native machine (computer) code 408.

Additionally, in one or more embodiments of the invention, problem solution 410 can already exist as a legacy program 412 written in the C programming language. A parallel programmer can then parallelize the program 414 deploying both the standard PThreads library for supporting traditional program threads and a p-AOP library for supporting the parallel Aspect-Oriented-Programming (p-AOP) language features described herein. The compiler can then compile this program down to native machine (computer) code 416.

Further, in one or more embodiments of the invention, problem solution 418 can already exist as an aspect-oriented sequential program 420 written in a language such as, for example, AspectJ. A parallel programmer can then parallelize this aspect-oriented program 422 using proposed p-AOP features implemented as language extensions to AspectJ, or using a p-AOP API/library (as depicted in FIG. 4). The compiler can then compile this program down to native machine (computer) code 424.

Figure 5:
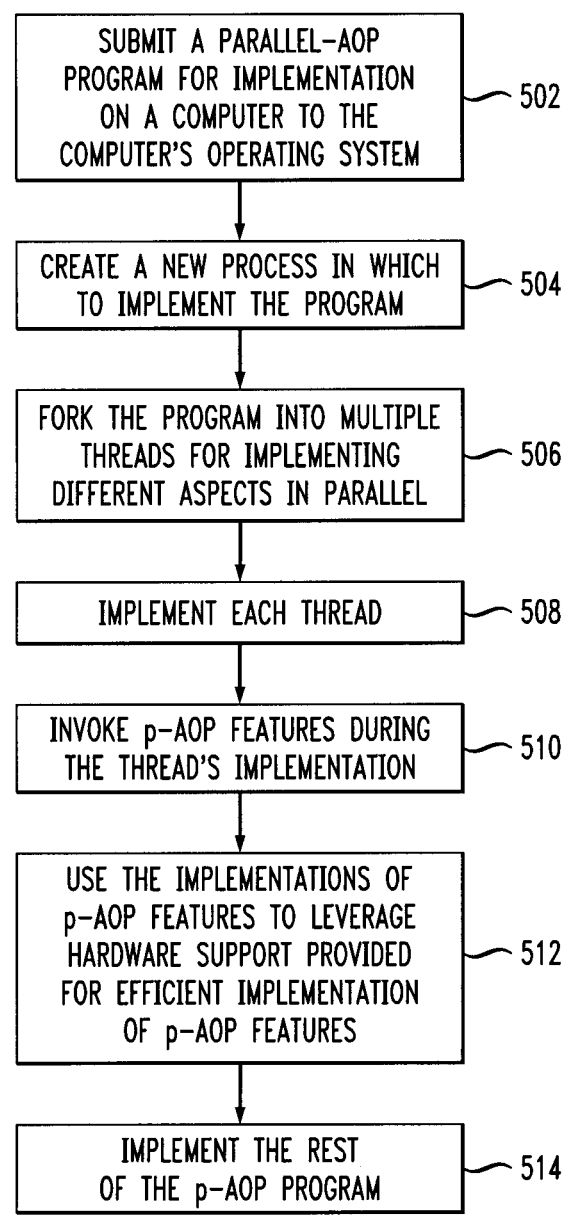
FIG. 5 is a flow diagram illustrating techniques for using one or more aspect-oriented parallelism primitives to implement one or more aspects of a program in parallel, according to an embodiment of the present invention.

FIG. 5 is a flow diagram illustrating techniques for using one or more aspect-oriented parallelism primitives to implement one or more aspects of a program in parallel, according to an embodiment of the present invention. Step 502 includes submitting (for example, via a user) a parallel-AOP program for implementation on a computer to the computer's operating system (OS). Step 504 includes the OS creating a new process in which to implement the program.

Step 506 includes, from within the process, forking the program into multiple threads for implementing different aspects in parallel. The forking of threads can be performed using different mechanisms in different contexts. For example, in a JAVA+p-AOP program, a new thread can be started by allocating a new instance of a sub-class of the Java class "Thread" and invoking the start( ) method for that instance. Also, in a C program that uses PThreads and a p-AOP library, a new thread can be started by invoking the pthread_create( ) routine in the PThreads API/library. Additionally, for example, in an AspectJ+p-AOP program, the p-AOP API/library can provide a thread( ) routine that takes as argument an aspect and implements that aspect in a new thread.

Step 508 includes implementing each thread. By way of example, each thread can implement in a separate processor core of a multi-core processor. Also, multiple threads can implement in simultaneous multi-threaded (SMT) fashion on the same core of the multi-core processor, or any combination of these two techniques. Step 510 includes, once multiple threads start implementation, each thread invoking p-AOP features (such as, for example, breakpoint, viewpoint, catch watchpoint, continue, etc.) during the thread's implementation. Depending on the implementation (multiple embodiments are illustrated in FIG. 4), each of these feature invocations are implemented by a call to the p-AOP library, by machine code compiled for the feature by the compiler, or by an OS-call.

Step 512 includes using the implementations of p-AOP features to leverage hardware support provided for efficient implementation of p-AOP features. For example, if a multi-core processor provides special hardware support for implementing the breakdown feature, the compiler would compile an invocation of breakpoint( ) in the program down to machine code that accesses and sets the hardware support for breakpoints provided in the multi-core processor. Step 514 includes implementing the rest of the p-AOP program, which, for example, can be similar to that of any threaded program or any shared-memory parallel program.

Figures 6, 7:
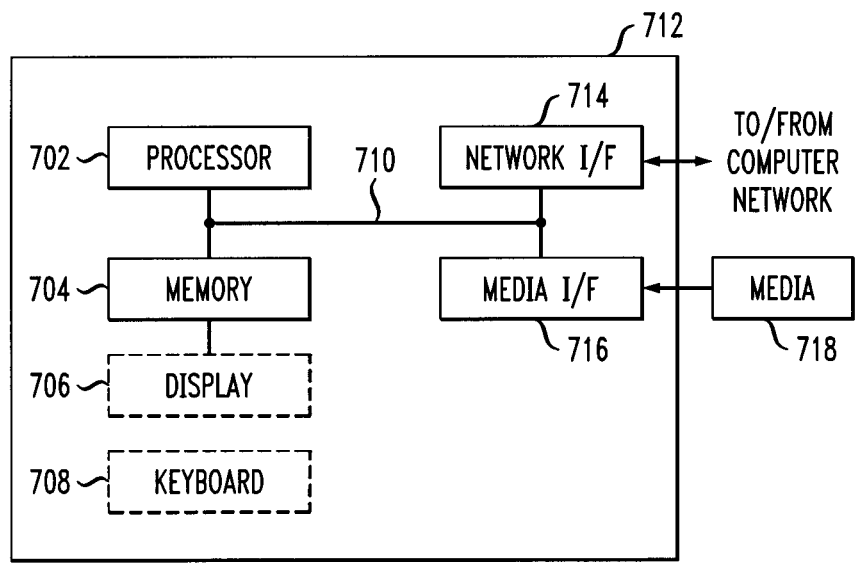
FIG. 6 is a flow diagram illustrating techniques for using one or more aspect-oriented parallelism primitives to implement one or more aspects of a program in parallel, according to an embodiment of the invention.
FIG. 7 is a system diagram of an exemplary computer system on which at least one embodiment of the invention can be implemented.

FIG. 6 is a flow diagram illustrating techniques for using one or more aspect-oriented parallelism primitives (or, for example, extensions) to implement one or more aspects of a program in parallel, according to an embodiment of the present invention. The techniques depicted in FIG. 6 can include, as described herein, providing a system, wherein the system includes distinct software modules, each of the distinct software modules being embodied on a tangible computer-readable recordable storage medium.

Step 602 includes using one or more aspect-oriented parallelism primitives to implement one or more aspects of a program in parallel, wherein implementing the one or more aspects of a program in parallel comprises implementing the one or more aspects of a program in parallel on a multi-core processor. This step can be carried out, for example, using at least one of a call to the p-AOP library module, machine code compiled by a compiler module and/or an OS-call.

Additionally, the aspect-oriented parallelism primitives can be embodied, for example, in a programming language extension, as one or more members of a library (for example, similar to what POSIX threads (PThreads) and message passing interface (MPI) do) and/or as an application programming interface.

Aspect-oriented parallelism primitives can include a language extension that enables a first thread to set a break-point on a second thread of a same program, wherein the second thread stops implementation when its break-point is reached in its control flow. Also, aspect-oriented parallelism primitives can include a language extension that enables a first thread to set a watch-point on at least one of a register and a memory location of a second thread of a same program, wherein the second thread stops implementation when its at least one of register or memory location, specified by the watch-point, changes value.

Further, in one or more embodiments of the invention, the one or more aspect-oriented parallelism primitives include a language extension that enables a thread to set a viewpoint on a sibling thread so as to query the sibling thread to send it a stream containing all of one or more values taken on by at least one of a register and a memory location specified in a view-point, wherein the thread queries to view the one or more values of the specified view-point without stopping the sibling thread. Additionally, the aspect-oriented parallelism primitives can include a language extension that enables a thread to issue a continuation to a stopped sibling thread to resuming implementation of the sibling thread.

One or more embodiments of the invention also include using a thread library to support parallelization of the aspects of a program, which can be carried out by a p-AOP library module similar to how the PThreads API/library supports traditional shared-memory parallelization. The p-AOP thread library can be used in lieu of p-AOP extensions to a programming language, much as the PThreads API/library is in lieu of any parallelism extensions to the C programming language. Also, one or more embodiments of the invention include using multi-core enhancements to support the aspect-oriented parallelism primitives, which can be carried out by a compiler module implementing on a hardware processor (wherein the compiler, for example, can compile an invocation of a feature and/or aspect in the program down to machine code that accesses and sets the hardware support for that feature and/or aspect provided in the multi-core processor). The techniques depicted in FIG. 6 can additionally include using hardware queues to support logical streams that carry data corresponding to viewpoints, wherein each hardware queue is accessible to a machine instruction set via a register identifier and/or a special memory address. Also, the hardware queues are specialized to be non-blocking and/or asynchronous.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 718) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 704), magnetic tape, a removable computer diskette (for example media 718), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code will include at least one processor 702 coupled directly or indirectly to memory elements 704 through a system bus 710. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Additionally, one or more embodiments of the invention can include an exemplary system where each "client" runs one instance of a program "aspect," and a common "server" runs another aspect of the program that is common to all the clients. As such, each client aspect may find it convenient to use the proposed aspect-oriented programming (AOP) extensions to coordinate/communicate with the "server" aspect.

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction to means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in FIG. 4. The method steps can then be carried out using the distinct software modules and/or sub-modules of the system, as described above, executing on a hardware processor. Further, a computer program product can include a tangible computer-readable storage medium with code adapted to be executed to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, parallel programming language features that allow different aspects or concerns of a program, compiled as separate threads, to interact with each other efficiently and effectively.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for using one or more aspect-oriented parallelism primitives to implement one or more aspects of a program in parallel, comprising:
    partitioning the program into two or more threads corresponding to two or more aspects of the program;
    implementing each of the two or more threads on a separate processor core of a multi-core processor in parallel; and
    invoking one or more parallel aspect-oriented programming features for each of the two or more threads during implementation of each thread to leverage hardware support provided for implementation of the one or more parallel aspect-oriented programming features to facilitate interaction amongst the two or more threads implementing on the multi-core processor in parallel, wherein said hardware support comprises a set of hardware queues implemented between each thread-pair of a core and between each thread-pair of neighboring cores of the multi-core processor to support one or more logical streams that carry data corresponding to one or more viewpoints, wherein each hardware queue is accessible to a machine instruction set via at least one of a register identifier and a special memory address, and each hardware queue is specialized to be at least one of non-blocking and asynchronous, and wherein said parallel aspect-oriented programming features comprise:
    a language extension that enables a first thread to set a break-point on a second thread of a same program, wherein the second thread stops implementation when its break-point is reached in its control flow;
    a language extension that enables a first thread to set a watch-point on at least one of a register and a memory location of a second thread of a same program, wherein the second thread stops implementation at any point in time corresponding to when the value of the at least one of register or memory location of the second thread changes; and
    a language extension that inserts a viewpoint instruction in a thread of interest so as to send multiple sibling threads a stream over a logical queue containing all of one or more values taken on by at least one of a register and a memory location of the thread of interest, as specified in the view-point instruction without stopping the multiple sibling threads.

2. The method of claim 1, wherein the one or more parallel aspect-oriented programming features are embodied in a programming language extension.

3. The method of claim 1, wherein the one or more parallel aspect-oriented programming features are embodied as an application programming interface.

4. The method of claim 1, wherein the one or more parallel aspect-oriented programming features are embodied as one or more members of a library.

5. The method of claim 1, wherein the one or more parallel aspect-oriented programming features comprise a language extension that enables a thread to issue a continuation to a stopped sibling thread to resuming implementation of the sibling thread.

6. The method of claim 1, further comprising using a thread library to support parallelization of the two or more aspects of the program.

7. The method of claim 1, wherein the method is run on a system, wherein the system comprises distinct software modules, each of the distinct software modules being embodied on a tangible computer-readable recordable storage medium.

8. The method of claim 7, wherein the one or more distinct software modules comprise a parallel aspect-oriented programming library module and a compiler module executing on a hardware processor.

9. A computer program product comprising a tangible computer readable recordable storage medium including computer useable program code for using one or more aspect-oriented parallelism primitives to implement one or more aspects of a program in parallel, wherein the computer usable program code comprises one or more distinct software modules, the computer program product including:
    computer useable program code for partitioning the program into two or more threads corresponding to two or more aspects of the program;
    computer useable program code for implementing each of the two or more threads on a separate processor core of a multi-core processor in parallel; and
    computer useable program code for invoking one or more parallel aspect-oriented programming features for each of the two or more threads during implementation of each thread to leverage hardware support provided for implementation of the one or more parallel aspect-oriented programming features to facilitate interaction amongst the two or more threads implementing on the multi-core processor in parallel, wherein said hardware support comprises a set of hardware queues implemented between each thread-pair of a core and between each thread-pair of neighboring cores of the multi-core processor to support one or more logical streams that carry data corresponding to one or more viewpoints, wherein each hardware queue is accessible to a machine instruction set via at least one of a register identifier and a special memory address, and each hardware queue is specialized to be at least one of non-blocking and asynchronous, and wherein said parallel aspect-oriented programming features comprise:

a language extension that enables a first thread to set a break-point on a second thread of a same program, wherein the second thread stops implementation when its break-point is reached in its control flow;

a language extension that enables a first thread to set a watch-point on at least one of a register and a memory location of a second thread of a same program, wherein the second thread stops implementation at any point in time corresponding to when the value of the at least one of register or memory location of the second thread changes; and a language extension that inserts a viewpoint instruction in a thread of interest so as to send multiple sibling threads a stream over a logical queue containing all of one or more values taken on by at least one of a register and a memory location of the thread of interest, as specified in the view-point instruction, without stopping the multiple sibling threads.

10. The computer program product of claim 9, wherein the one or more parallel aspect-oriented programming features are embodied at least one of in a programming language extension, as one or more members of a library, and as an application programming interface.

11. The computer program product of claim 9, wherein the one or more parallel aspect-oriented programming features comprise a language extension that enables a thread to issue a continuation to a stopped sibling thread to resuming implementation of the sibling thread.

12. A system for using one or more aspect-oriented parallelism primitives to implement one or more aspects of a program in parallel, comprising:

a memory; and at least one processor coupled to the memory and operative to:

partition the program into two or more threads corresponding to two or more aspects of the program;

implement each of the two or more threads on a separate processor core of a multi-core processor in parallel; and invoke one or more parallel aspect-oriented programming features for each of the two or more threads during implementation of each thread to leverage hardware support provided for implementation of the one or more parallel aspect-oriented programming features to facilitate interaction amongst the two or more threads implementing on the multi-core processor in parallel, wherein said hardware support comprises a set of hardware queues implemented between each thread-pair of a core and between each thread-pair of neighboring cores of the multi-core processor to support one or more logical streams that carry data corresponding to one or more viewpoints, wherein each hardware queue is accessible to a machine instruction set via at least one of a register identifier and a special memory address, and each hardware queue is specialized to be at least one of non-blocking and asynchronous, and wherein said parallel aspect-oriented programming features comprise:

a language extension that enables a first thread to set a break-point on a second thread of a same program, wherein the second thread stops implementation when its break-point is reached in its control flow;

a language extension that enables a first thread to set a watch-point on at least one of a register and a memory location of a second thread of a same program, wherein the second thread stops implementation at any point in time corresponding to when the value of the at least one of register or memory location of the second thread changes; and a language extension that inserts a viewpoint instruction in a thread of interest so as to send multiple sibling threads a stream over a logical queue containing all of one or more values taken on by at least one of a register and a memory location of the thread of interest, as specified in the view-point instruction, without stopping the multiple sibling threads.

13. The system of claim 12, wherein the one or more parallel aspect-oriented programming features are embodied at least one of in a programming language extension, as one or more members of a library, and as an application programming interface.

14. The system of claim 12, wherein the one or more parallel aspect-oriented programming features comprise a language extension that enables a thread to issue a continuation to a stopped sibling thread to resuming implementation of the sibling thread.

15. An apparatus for using one or more aspect-oriented parallelism primitives to implement one or more aspects of a program in parallel, the apparatus comprising:

means for partitioning the program into two or more threads corresponding to two or more aspects of the program;

means for implementing each of the two or more threads on a separate processor core of a multi-core processor in parallel; and means for invoking one or more parallel aspect-oriented programming features for each of the two or more threads during implementation of each thread to leverage hardware support provided for implementation of the one or more parallel aspect-oriented programming features to facilitate interaction amongst the two or more threads implementing on the multi-core processor in parallel, wherein said hardware support comprises a set of hardware queues implemented between each thread-pair of a core and between each thread-pair of neighboring cores of the multi-core processor to support one or more logical streams that carry data corresponding to one or more viewpoints, wherein each hardware queue is accessible to a machine instruction set via at least one of a register identifier and a special memory address, and each hardware queue is specialized to be at least one of non-blocking and asynchronous, and wherein said parallel aspect-oriented programming features comprise:

a language extension that enables a first thread to set a break-point on a second thread of a same program, wherein the second thread stops implementation when its break-point is reached in its control flow;

a language extension that enables a first thread to set a watch-point on at least one of a register and a memory location of a second thread of a same program, wherein the second thread stops implementation at any point in time corresponding to when the value of the at least one of register or memory location of the second thread changes; and a language extension that inserts a viewpoint instruction in a thread of interest so as to send multiple sibling threads a stream over a logical queue containing all of one or more values taken on by at least one of a register and a memory location of the thread of interest, as specified in the view-point instruction, without stopping the multiple sibling threads.

* * * * *